Oct. 27, 1931.  A. KATZMAN ET AL  1,829,521
MIRROR DOOR
Filed Dec. 21, 1929
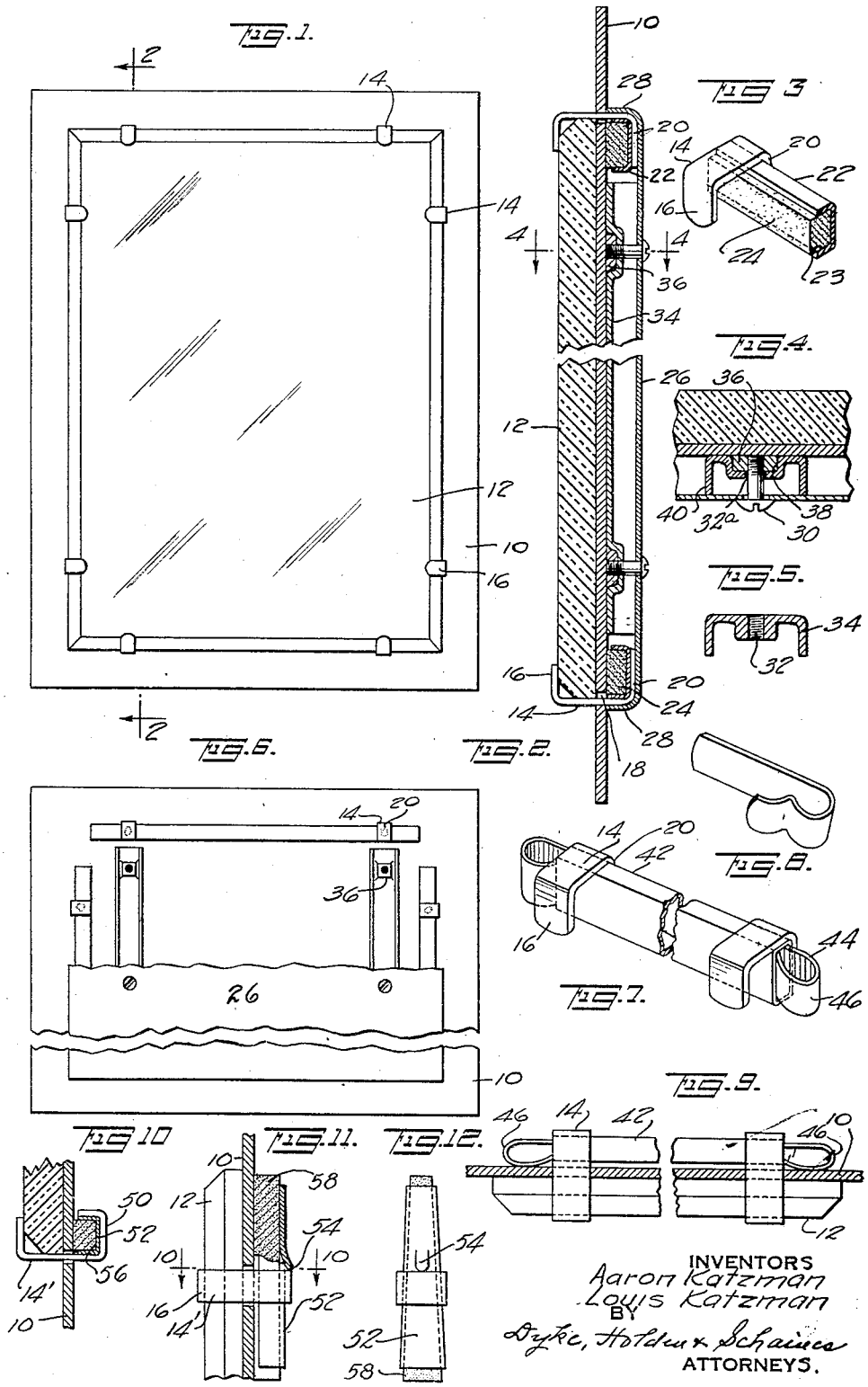
INVENTORS
Aaron Katzman
Louis Katzman
BY
Dyke, Holden & Schaines
ATTORNEYS.

Patented Oct. 27, 1931

1,829,521

UNITED STATES PATENT OFFICE

AARON KATZMAN AND LOUIS KATZMAN, OF BROOKLYN, NEW YORK

MIRROR DOOR

Application filed December 21, 1929. Serial No. 415,694.

Our invention relates to means for securing a mirror to a door or the like.

An object of the invention consists in the provision of mirror holding clips extending through openings in the door and resiliently retracted by means applied behind the door. In this way the mirror can be neatly and snugly held without danger of breaking, the resilient means being concealed behind the door.

Another object consists in the provision on the back of the door of a flanged cover completely enclosing the clips and retracting means and giving the door-back a neat, attractive appearance free from exposed openings.

The invention will be best understood from the following description of illustrative embodiments thereof.

In the drawings:

Fig. 1 is a front elevation;

Fig. 2 is a section on line 2—2, Fig. 1;

Fig. 3 is a perspective detail of a part of Fig. 2;

Fig. 4 is a section on line 4—4, Fig. 2;

Fig. 5 is a similar section of a modification;

Fig. 6 is a rear elevation of Fig. 1 with parts broken away;

Fig. 7 is a perspective of a modified form of clip retracting device;

Fig. 8 is a perspective of an expansion spring used with the clip connecting means of Fig. 7;

Fig. 9 is a transverse section of a door equipped with the retracting means of Figs. 7 and 8; and Figs. 10, 11 and 12 are, respectively, transverse and longitudinal sections and a rear perspective of a further modified form of cushion means for retracting a holding clip.

Reference numeral 10 designates the plate or door to which mirror 12 is attached by clips 14 having fingers 16 to engage the mirror 12. Clips 14 extend through holes 18 to the back of door 10 and the formation of their rearwardly projecting portions depends on the mode of retraction adopted.

In the form of Figs. 1–3, clips 10 have a lateral extension 20 by which they are secured, as by spot welding, in pairs to a U-bar 22 the recess 23 wherein faces toward the back of the door and receives a cushion member 24 of sponge rubber or the like of dimension to project from recess 23 and make resilient thrusting engagement with the back of door 10 to thereby retract slips 14, fingers 16 thereof, and mirror 12. Attachment of the clips to bars 22 in the manner described facilitates assembly. Two or more clips are thereby set in place at one time.

The bars 22, clips 14 and cushions 24 can be enclosed within the flanged cover 26, the flanges 28 of which engage closely against the back of the door. Cover 26 can be secured by screws 30 which may either be screwed into screw-threaded openings 32 (Fig. 5) in bars 34 attached, as by spot welding to the back of the door, or may extend through holes 32a and be screwed into nuts 36 inserted into recesses 38 provided therefor in bars 34. Nuts 36 are preferably spot welded into place in the recesses provided therefor before bars 34 are attached to the door-back, and thus the screws can be screwed home without manually adjusting or holding the nuts during insertion of the screws. The flanges 40 of bars 34 are preferably of the same height as the flanges 28 of covers 26, enabling the cover plates 26 to be quite thin and yet be held in plane surface formation.

An alternative form of detachable spring retracting means for retracting the clips may comprise rectangularly tubular connecting members 42 (Fig. 7) for connecting the clips 14 in pairs, as by being spot welded to clip extensions 20, and springs 44 of substantially hairpin form and adapted when compressed and pushed into the ends of the tubular connections 42 to leave a spring loop 46 projecting therefrom adapted to make a resilient retracting engagement with the back of door 10, as clearly shown in Fig. 9.

Another form of cushion retractor is as shown in Figs. 10, 11 and 12, in which the clip 14' is formed with a substantially hooked part 50 which receives a wedge shaped U-bar 52 with a struck up tongue 54 to retain it in place within hook 50 and with the inwardly opening recess 56 thereof receiving a cushion member 58 of sponge rubber or the like which projects from recess 56 and makes retracting resilient engagement with the back of door 10. The cover arrangement of Figs. 1-5 can also be used with the modified forms of clip retractor means, as will be readily understood.

The invention, while having its most common application to doors, as doors of medicine cabinets, can be used in other connections where the rear wall of the member carrying the mirror is exposed, as in case of thin partitions and the like, and in our claims the term "door" is made use of in such sense.

Having thus described our invention, what we claim as new and desire to secure by Letters Patent is:—

1. A door having openings therethrough, a mirror, clip members extending through the openings in the door from the back and having fingers engaging the mirror, resilient cushion means reacting against the door-back and serving to exert thrust on the clip members behind the door to thereby clamp the mirror by the clip fingers snugly but yieldably against the door, said resilient cushion means comprising a cross-bar and a resilient cushion, said cross-bar connecting certain of the clip members behind the door and being recessed on the side toward the door-back, with said resilient cushion in said recess and exerting thrust against the door-back.

2. A door having openings therethrough, a mirror, clip members extending through the openings in the door from the back and having fingers engaging the mirror, resilient cushion means reacting against the door-back and serving to exert thrust on the clip members behind the door to thereby clamp the mirror by the clip fingers snugly but yieldably against the door, said resilient cushion means comprising substantially tubular members connecting clips in pairs and spring members removably inserted in the ends of the tubular members and bearing resiliently against the door-back.

3. A door having openings therethrough, a mirror, clip members extending through the openings in the door from the back and having fingers engaging the mirror, resilient cushion means reacting against the door-back and serving to exert thrust on the clip members behind the door to thereby clamp the mirror by the clip fingers snugly but yieldably against the door, said clip member being provided behind the door with a substantially hooked portion, and said resilient cushion means comprising a wedge member inserted under said hooked portion and a cushion member interposed between the wedge member and the door-back.

4. A door having openings therethrough, a mirror, clip members having fingers extending through the openings and engaging the mirror, cushion means reacting against the door-back and against parts of the clip members respectively to snugly but yieldably clamp the mirror on the door by the clip member fingers, flanged bars on the door-back and having apertures therein and nuts held captive behind the apertures and in alignment therewith, and a flanged cover plate detachably secured on the door-back by screws passing through the cover plate through the holes in the bars and screwed into said captive nuts, and said cover plate being arranged to enclose the bars on the door-back and the parts of the clip members projecting backwardly from the door.

In testimony whereof we have signed our names hereto.

AARON KATZMAN.
LOUIS KATZMAN.